United States Patent
Krone et al.

[11] Patent Number: 6,009,834
[45] Date of Patent: Jan. 4, 2000

[54] TEAT CUP ASSEMBLY FOR A MILKING MACHINE

[75] Inventors: Otto Krone, Besten; Manfred Wulle, Ahlen, both of Germany

[73] Assignee: Westfalia Landtechnik GmbH, Oedle, Germany

[21] Appl. No.: 09/153,600

[22] Filed: Sep. 15, 1998

[51] Int. Cl.[7] ........................................ A01J 5/06
[52] U.S. Cl. ........................................ 119/14.47
[58] Field of Search .............. 119/14.47, 14.48, 119/14.49, 14.5, 14.51, 14.52, 14.53

[56] References Cited

U.S. PATENT DOCUMENTS

| | | | |
|---|---|---|---|
| 988,708 | 4/1911 | Henrichsen et al. | 119/14.47 X |
| 1,620,916 | 3/1927 | Pessell | 119/14.49 |
| 2,986,117 | 5/1961 | Ronaldson | 119/14.49 X |
| 4,452,177 | 6/1984 | Plett . | |

FOREIGN PATENT DOCUMENTS

| | | |
|---|---|---|
| 0 088 580 | 9/1987 | European Pat. Off. . |
| 0 566 977 B1 | 9/1995 | European Pat. Off. . |
| 43 15 665 A1 | 11/1994 | Germany . |

*Primary Examiner*—Robert P. Swiatek
*Attorney, Agent, or Firm*—Alston & Bird LLP

[57] ABSTRACT

A teat cup assembly for a milking machine and having a teat receptacle 21 which is in the form of an elastic sleeve 2 having an upper inlet opening 18 and a lower outlet opening 22. The teat cup assembly is provided with an outlet 6 connecting to a milking line. In the flow passage below the teat receptacle, a valve arrangement is formed with a valve chamber 12 accommodating a moveable valve body 8, by which the flow passage is closed in a closed position and opened in an open position. Arranged on the teat cup casing 1 is an actuating element 10 that is connected to valve body 8 and can be displaced away from the inlet opening 18 for closing the flow passage or displaced in a direction toward the inlet opening 18 for opening the flow passage.

7 Claims, 1 Drawing Sheet

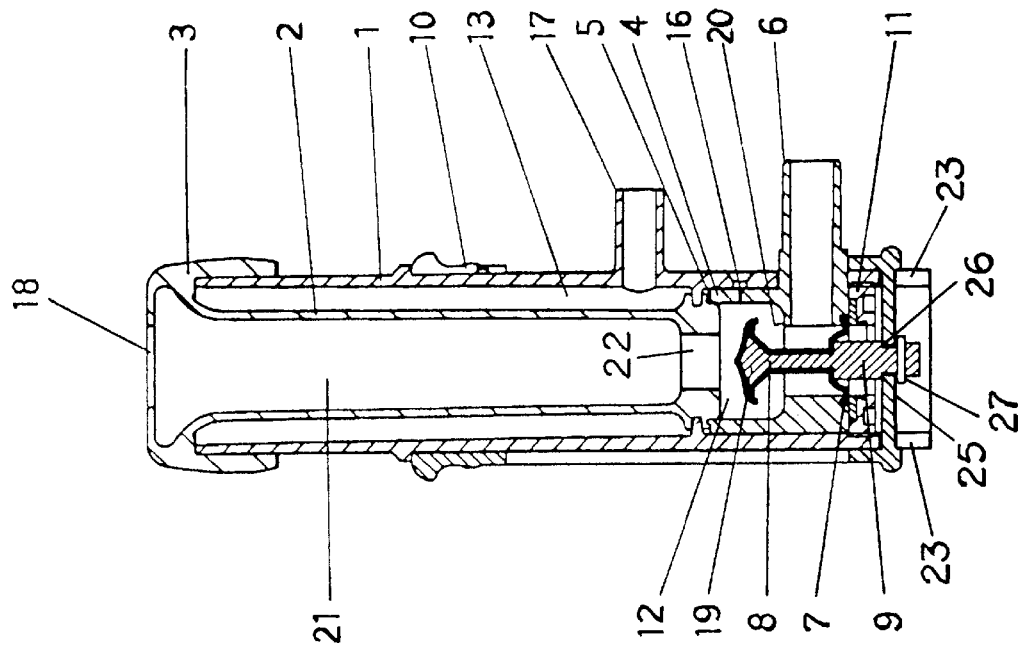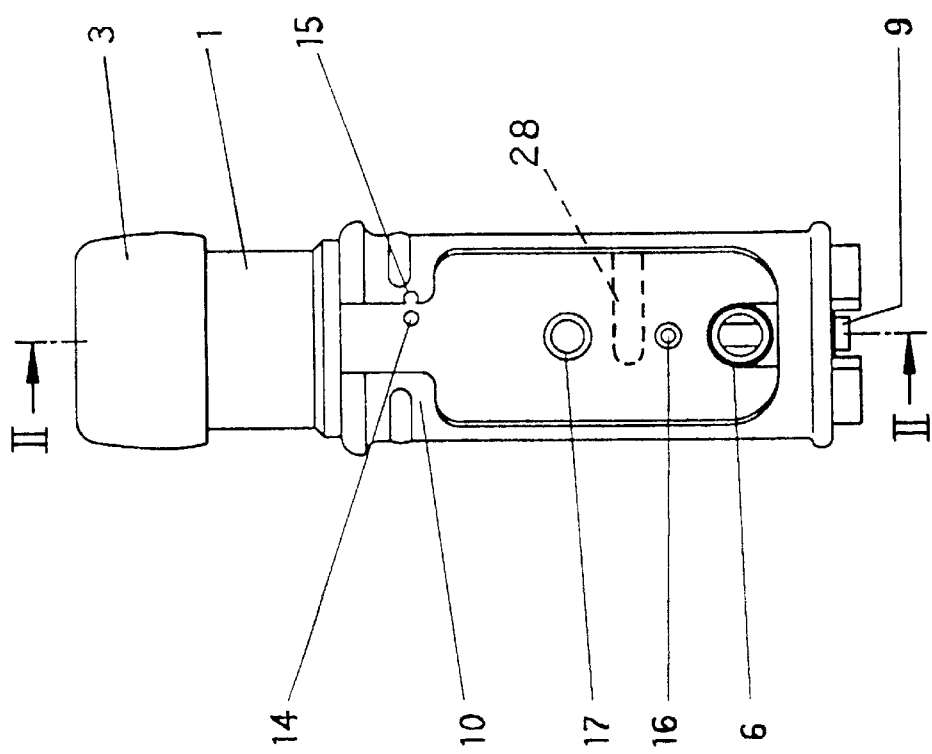

TEAT CUP ASSEMBLY FOR A MILKING MACHINE

BACKGROUND OF THE INVENTION

The present invention relates to a teat cup assembly with a valve arrangement, and which is adapted for use with a milking machine.

Known are teat cups composed of a teat receptacle having an inlet opening and which is defined by an elastic teat sleeve. The teat receptacle is arranged in a teat cup casing which forms a pulsating chamber therebetween. Below the teat receptacle, an outlet is provided for connection to a milking line. The pulsating chamber connects via an inlet to a pulsator, whereby the teat receptacle sequentially exerts a force on a teat, when the teat is positioned in the teat receptacle. Within the teat cup assembly, a vacuum is generated via the milking line, which causes the milk emerging from the teat to be sucked out.

A teat cup of the above type is disclosed in EP 0 088 580. This teat cup also comprises a spherical closing body, which shuts off the outlet to the milking line. However, it is possible to shut off the outlet at the end of the milking process only when atmospheric air is manually admitted at the head of the elastic teat sleeve. The air that is temporarily admitted after each milking operation leads to undesired vacuum fluctuations and milk turbulences in the milking line.

DE 43 15 665 A1 discloses a teat cup assembly with a teat receptacle having an inlet opening and which is defined by an elastic teat sleeve, a teat cup casing which accommodates the teat sleeve while forming a pulsating chamber, and an outlet connecting to a milking line. Below the teat receptacle, the teat cup assembly is provided with a valve arrangement, which closes the flow passage in a closed position and opens same in an open position. To actuate the valve arrangement, an actuating element is provided on the teat cup casing.

EP 0 566 977 B1 discloses a teat cup assembly which comprises a valve arrangement in the flow passage below the teat receptacle. The valve arrangement includes a valve body provided in a valve chamber. This valve body closes the flow passage in a closed position and opens same in an open position. In the open position, the valve arrangement is opened downward by manual actuation of the teat cup. EP 0 566 977 B1 further suggests that an actuation of the valve arrangement can also be realized by a lateral movement of the teat cup.

During the removal of the teat cup assembly by a lateral movement of the teat cup, the teat that is still under a milking vacuum, is subjected to physical stress. Furthermore, the operability is dependent on the quality, in particular the stiffness of the continuing milk line, since same must absorb the counteracting force of the teat cup, so that it is possible to open or close the valve.

Based on the foregoing, it is an object of the present invention to further develop a teat cup assembly such that opening or closing of the flow passage is simplified by the valve arrangement. A further object of the invention is to design and construct the teat cup assembly such that the valve body automatically reaches its closed position, when the teat cup assembly is removed from the teat during a still ongoing milking operation.

SUMMARY OF THE INVENTION

The above and other objects and advantages of the present invention are achieved by the provision of a teat cup assembly which comprises a teat receptacle including an elastic sleeve having an upper inlet opening and a lower outlet opening. A teat cup casing coaxially surrounds the teat receptacle in a spaced apart relationship so as to define a pulsating chamber therebetween, and a valve chamber is mounted to the casing so as to communicate with the lower outlet opening of the teat receptacle and with a milk outlet line. The valve chamber includes a valve seat disposed between the outlet opening of the teat receptacle and the milk outlet line, and a valve body is disposed in the valve chamber for axial movement between a raised open position so as to define a flow passage between the outlet opening of the teat receptacle and the milk outlet line, and a lowered position resting on the valve seat and closing the flow passage. Also, a tubular actuating element is mounted coaxially about the valve casing so as to be axially slidable between a raised position and a lowered position. The tubular actuating element is connected to the valve body so that the valve body is raised to its raised open position to thereby open the flow passage when the tubular actuating element is raised to its raised position, and the valve body is lowered to its lowered position to close the flow passage when the tubular actuating element is lowered to its lowered position.

The fact that the tubular actuating element is axially slidably upon the teat cup casing, and is displaceable away from the inlet opening for closing the flow passage and displaceable in a direction toward the inlet opening for opening the flow passage, renders it possible to achieve an opening and closing of the flow passage by movements as are typically performed by an operator when applying or removing the assembly. Thus, a fast and comfortable handling of the teat cup assembly is accomplished.

In a manual operation of the teat cup assembly in accordance with the invention, namely when applying the teat cup assembly, the operator encloses the actuating element with his hand, since the actuating element is arranged on the teat cup casing. As the teat cup assembly is applied, the operator slips the receptacle over the teat, which occurs by a substantially vertical, upwardly directed movement. In the case of the teat cup assembly in accordance with the invention, the flow passage is bound to be opened only when the teat receptacle surrounds the teat, and the operator continues its vertically upward directed movement, which causes the actuating element to slide in the direction of the inlet opening.

When removing the teat cup assembly, the operator encloses the assembly with his hand and, thus, likewise the actuating element, and performs a vertically downwardly directed movement, which removes the teat cup assembly from the teat. Before the teat cup assembly is pulled off the teat, the actuating element enclosed by the operator's hand is moved away from the inlet opening, so that the flow passage is closed. As a result of closing the flow passage, the vacuum in the teat receptacle is discontinued, so that it becomes easier to pull off the assembly.

Contrary to the teat cup assembly of the present invention, an embodiment of the teat cup assembly known from the prior art, in particular DE 43 15 665 requires several manipulations. To the extent a person of skill in the art can note from FIG. 2 of DE 43 15 665, the latter suggests that the operator actuate a lever after applying or before removing the teat cup assembly. Thus, two independent operating steps are required which complicate the application of the assembly. However, when using the assembly of the present invention, the operator automatically encloses with his hand the tubular actuating element for actuating the valve arrangement, when the teat cup assembly is applied or removed.

The assembly disclosed in DE 43 15 665 not only requires the operator to perform several operating steps, but the operator must also make sure that the lever is actuated at the right time, since DE 43 15 665 involves the risk that a valve is prematurely opened by the lever. A premature opening of the valve by the lever results in atmospheric air being sucked into the milking line, which is undesirable. Should the operator actuate the lever too late while removing the teat cup assembly, the teat of a cow will be subjected to unnecessary stress. These disadvantages are eliminated with the use of a teat cup assembly designed and constructed in accordance with the invention, inasmuch as the flow passage either is opened only when the teat is in the teat receptacle, so that no leakage air is sucked in, or it is first closed and the assembly is subsequently pulled off the teat, so that no leakage air is sucked in, and the cow's teat is not stressed. As a result of eliminating leakage air, vacuum fluctuations and milk turbulences in the milk unit are avoided.

The embodiment of the teat cup assembly in accordance with the invention is of advantage in particular in a manual operation of the teat cup assembly. However, the use of the teat cup assembly is not limited to only a manual use thereof, and it may also be used in combination with automatic teat cup application systems, in particular robots. When a teat cup assembly is automatically applied, a corresponding gripper of a robot arm encloses the tubular actuating element and performs essentially the same movement as occurs during a manual application of the teat cup assembly. Even the removal of the teat cup assembly from a teat may occur by means of an automatic milking system. To this end, a gripper encloses the tubular actuating element and performs the corresponding movement. It may be useful to design and construct the actuating element such that same is adapted to the geometry of a gripper of an automatic milking system. The use of the teat cup assembly in combination with automatic systems would have the advantage of largely avoiding vacuum drops or vacuum losses upon removing the teat cup assembly.

According to a further advantageous embodiment of the invention, it is proposed to adapt the valve chamber for connection to the ambient atmosphere via an opening in the teat cup casing. This embodiment has the advantage that in the case of a closed valve body, a ventilation is realized via the opening, which permits a gentle removal of the teat receptacle from the teat, i.e., substantially without a vacuum between the teat receptacle and the teat.

Preferably, the opening is arranged such that same is at least partially closed by the actuating element in its lowered or closed position and opened by the actuating element in its raised or open position. Thus during a milking operation, the air flowing in through the opening causes a faster transportation of the milk into the milking system.

A further advantageous embodiment of the invention proposes to connect the valve body to an annular diaphragm that extends substantially perpendicularly to the axial extension of the valve body and surrounds same, and to arrange the diaphragm stationarily in its edge region below the outlet leading to the milking line. Through the milking line, a vacuum is generated in the valve chamber, when a teat is inserted into the teat receptacle. As a result of the vacuum, a force is exerted on the diaphragm connected to the valve body, by which the valve body is held in the opened position. It is therefore not absolutely necessary that the actuating element be held in the open position of the valve arrangement.

Preferably, the valve body has a head for contacting a valve seat, with the surface area of the head being larger than the surface area of the diaphragm. This configuration has the advantage that the valve body is held securely and reliably in the closed position.

A further advantageous embodiment proposes to design and construct the actuating element so that it can be rotated and secured in the raised open position of the valve arrangement. This embodiment has the advantage that it facilitates cleaning of the teat cup assembly. It also makes it possible to maintain the opened position during a cleaning operation, and to prevent the valve body from shutting off the flow passage as a result of flow forces of, for example, a scavenging agent.

Preferably, for releasably securing the actuating element in the raised open position on the teat cup casing, the actuating element has a slot for engagement, in particular locking engagement with a projection formed on the teat cup casing.

BRIEF DESCRIPTION OF THE DRAWINGS

Further details and advantages of the invention are described with reference to a preferred embodiment of the teat cup assembly illustrated in the drawing, in which:

FIG. 1 is a front view of the teat cup assembly; and

FIG. 2 is a sectional view of the teat cup assembly of FIG. 1 along line II—II.

DETAILED DESCRIPTION OF THE PREFERRED EMBODIMENT

The teat cup assembly comprises a teat cup casing 1. The teat cup casing 1 accommodates a teat sleeve 2 formed of a rubber-elastic material and having a head 3 engaging over the teat cup casing 1. The head 3 has an inlet opening 18, and the lower end of the sleeve has an outlet opening 22. The head 3 of the teat sleeve 2 is sealed against the teat cup casing 1. Between the teat sleeve 2 and teat cup casing 1 a pulsating chamber 13 is formed, which can be connected via an inlet 17 to a pulsator not shown. The lower region of the pulsating chamber 13 is sealed by means of an inner member 4 which is arranged in teat cup casing 1. The inner member 4 includes a ring 5 which prevents the elastic teat sleeve 2 from being sucked into the lower region of the teat cup assembly when a vacuum is applied. The teat sleeve 2 defines a teat receptacle 21 for receiving a teat.

The inner member 4 defines in part a valve chamber 12 which communicates with the lower outlet opening 22 of the sleeve 2 and accommodates a valve body 8. The valve body 8 comprises a head 19 which is supported on a stem 9, and the stem 9 is connected to an actuating element 10. The actuating element 10 is essentially tubular and adapted for movement in the axial direction of the teat cup assembly.

The head 19 of valve body 8 is designed for contacting a valve seat 20. Below the valve seat 20, an outlet 6 is arranged for connection to a milking line. FIG. 2 shows the valve body in an open position.

The stem 9 is connected to an annular diaphragm 7 that extends substantially perpendicularly to the axial extension of the valve body 8 and surrounds the stem 9. The diaphragm 7 is stationarily held along in its outer edge region below the outlet 6. To secure the diaphragm 7 and inner member 4, a ring 11 is provided through which the stem 9 extends, and which sealingly presses the outer edge region of diaphragm 7 and the lower region of the casing against the inner member 4. The ring 11 has an external screw thread which meshes with an internal screw thread of the teat cup casing 1.

The stem 9 is connected to the tubular actuating element 10 such that the actuating element is rotatable about the axis of the casing. More particularly, the lower end of the teat cup casing 1 includes aligned axial slots 23, and a connecting element 25 extends transversely through both slots 23. The connecting element 25 has a central opening through which the stem 9 extends, and the stem 9 is provided with a shoulder 26 and a securing ring 27. The connecting element 25 is held between the shoulder 26 and the ring 27, and thus the valve body 8 moves axially with the actuating element 10, while permitting limited rotational movement of the actuating element 10.

In the illustrated embodiment, the actuating element 10 can be releasably secured in the open position. To this end, the actuating element 10 has a slot 15 for receiving a projection 14 which is mounted on the teat cup casing 1.

A relatively small opening 16 communicates with the valve chamber at a location between the outlet opening 22 of the teat receptacle and the valve seat 20. Also, the actuating element 10 may include an arm 28, shown in dashed lines in FIG. 1, which acts to at least partially close the opening 16 when the actuating element is in its lowered position and the flow passage is closed. The opening 16 will be fully open when the actuating element 10 is raised.

When applying the teat cup assembly to a teat, the actuating element 10 is displaced in a direction toward the inlet opening 18, as soon as the teat is entirely accommodated within the teat receptacle 21. To do so, the operator encloses with his hand the actuating element 10 and performs a typical application movement on the teat. The actuating element 10 is rigidly connected to the valve body 8, so that the valve body performs the same movement as the actuating element 10. The valve body thus opens the flow passage between the teat receptacle 21 and the outlet 6 or a milking line. Through the milking line, a vacuum is generated which exerts a force on the diaphragm 7 formed on valve body 8. As a result, the valve body 8 is held in its open position, so that the milk can flow into the milking line.

When removing the teat cup assembly, the operator encloses with his hand the actuating element 10 and slides same relatively quickly with respect to the teat cup casing 1 away from the inlet opening 18. The valve body 8 performs the same movement as the actuating element 10, and thus the head 19 of valve body 8 comes into contact with the valve seat 20, thereby closing the flow passage. During this operation, the teat cup assembly is held by a vacuum inside the valve chamber on the teat being in the teat receptacle 21. The valve body 8 shuts off the flow passage to the milking line, and the interior of the teat cup casing 1 may be ventilated through the opening 16 when it is only partially closed by the arm 28. This ventilation occurs relatively quickly, so as to permit a gentle removal of the teat cup assembly from the teat.

The effective sealing surface area of the valve head 19 is larger than the effective surface area of diaphragm 7. The atmospheric pressure and the vacuum applied to the outlet 6 cause the head 19 to be held against valve seat 20.

When the teat cup assembly is removed from the teat, atmospheric air flows via inlet opening 18 into the valve chamber 12. Due to the drop of the vacuum and the air flow onto the valve body 8, the diaphragm 7 moves downward and causes the flow passage to the milking line to be closed. This allows to achieve a very rapid shutoff of the milking vacuum.

For scavenging the teat cup assembly, the actuating element 10 causes the valve body 8 to move to its open position. The actuating element is rotated about the longitudinal axis, so that the projection 14 engages in the slot 15 and keeps the actuating element 10 in this position.

That which is claimed:

1. A teat cup assembly for a milking machine comprising
   a teat receptacle including an elastic sleeve having an upper inlet opening and a lower outlet opening,
   a teat cup casing coaxially surrounding the teat receptacle in a spaced apart relationship so as to define a pulsating chamber therebetween,
   a valve chamber mounted to said casing so as to communicate with said lower outlet opening of said teat receptacle and with a milk outlet line, said valve chamber including a valve seat disposed between said outlet opening of said teat receptacle and said milk outlet line,
   a valve body disposed in said valve chamber for axial movement between a raised open position so as to define a flow passage between said outlet opening of said teat receptacle and said milk outlet line, and a lowered position resting on said valve seat and closing said flow passage, and
   a tubular actuating element mounted coaxially about said teat cup casing so as to be axially slidable between a raised position and a lowered position, with said tubular actuating element being connected to said valve body so that the valve body is raised to its raised open position to thereby open the flow passage when the tubular actuating element is raised to its raised position, and the valve body is lowered to its lowered position to close the flow passage when the tubular actuating element is lowered to its lowered position.

2. The teat cup assembly as defined in claim 1 further comprising a relatively small opening communicating with the valve chamber at a location between said outlet opening of said teat receptacle and said valve seat for admitting ambient air thereinto.

3. The teat cup assembly as defined in claim 2 wherein said opening is positioned so as to be at least partially closed by the tubular actuating element when the tubular actuating element is in its lowered position and the flow passage is closed, and the opening is open when the actuating element is raised and the flow passage is open.

4. The teat cup assembly as defined in claim 1 wherein said valve body is connected to said valve casing by means of a flexible annular diaphragm which is disposed below said valve seat and below said milk outlet line.

5. The teat cup assembly as defined in claim 4 wherein said valve body includes a valve head for engaging said valve seat, with the effective surface area of said head being greater than the effective surface area of said diaphragm.

6. The teat cup assembly as defined in claim 1 wherein said tubular actuating element and said teat cup casing include interengaging means for releasably retaining said tubular actuating element in its raised position.

7. The teat cup assembly as defined in claim 6 wherein said tubular actuating element is mounted to said teat cup casing so as to permit limited relative rotation therebetween, and wherein said interengaging means comprises a projection formed on said teat cup casing and a slot formed in said tubular actuating element for receiving said projection such that the interengaging means is operable upon relative rotation in one direction and released upon relative rotation in the other direction.

* * * * *

UNITED STATES PATENT AND TRADEMARK OFFICE
CERTIFICATE OF CORRECTION

PATENT NO. : 6,009,834

DATED : January 4, 2000

INVENTOR(S) : Krone et al.

It is certified that error appears in the above-identified patent and that said Letters Patent is hereby corrected as shown below:

Title page, item [73], in the Assignee's address, "Oedle" should read --Oelde--.

Title page, insert the following:

--Foreign Application Priority Data

Sept. 15, 1997   Germany   19740537. 1-23--.

Signed and Sealed this

Twenty-fourth Day of October, 2000

*Attest:*

*Attesting Officer*

Q. TODD DICKINSON

*Director of Patents and Trademarks*